(12) United States Patent
Seki et al.

(10) Patent No.: US 6,769,699 B2
(45) Date of Patent: Aug. 3, 2004

(54) COVER GASKET FOR HARD DISK DEVICE

(75) Inventors: Shota Seki, Shizuoka (JP); Masayuki Kishimoto, Shizuoka (JP); Hiromi Hayashi, Shizuoka (JP); Norikazu Sato, Shizuoka (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 10/148,892

(22) PCT Filed: Aug. 28, 2001

(86) PCT No.: PCT/JP01/07368

§ 371 (c)(1),
(2), (4) Date: Jun. 18, 2002

(87) PCT Pub. No.: WO02/21534

PCT Pub. Date: Mar. 14, 2002

(65) Prior Publication Data

US 2002/0190484 A1 Dec. 19, 2002

(30) Foreign Application Priority Data

Sep. 1, 2000 (JP) ........................ 2000-264831
Nov. 13, 2000 (JP) ........................ 2000-344617

(51) Int. Cl.⁷ .............................................. F16J 15/02
(52) U.S. Cl. ........................................ 277/628; 277/637
(58) Field of Search ................................ 277/602, 606, 277/609, 616, 625, 626, 627, 628, 630, 637, 641, 644, 650, 654, 906, 915, 921, 922

(56) References Cited

U.S. PATENT DOCUMENTS 3,544,066 A * 12/1970 Fawkes ...................... 251/306
3,694,894 A * 10/1972 Jelinek et al. ................ 29/451
4,363,192 A * 12/1982 Soucy .......................... 49/453
4,527,807 A * 7/1985 Urbanick ................... 277/642
4,621,469 A * 11/1986 Kruschwitz ................. 52/208
5,647,255 A * 7/1997 Stone ........................... 83/19
6,030,104 A * 2/2000 Shu ............................ 362/486
6,202,983 B1 * 3/2001 Hartman et al. ............ 251/306
6,287,402 B2 * 9/2001 Soldner ....................... 156/71
6,494,466 B1 * 12/2002 Hartman et al. ............ 277/641

FOREIGN PATENT DOCUMENTS

| FR | 2616465 A1 | * 12/1988 | ............ E04B/1/68 |
| JP | 1993-90654 | 4/1993 | |
| JP | 5290563 | 11/1993 | |
| JP | 2517797 | 5/1996 | |
| JP | 1999-44362 | 2/1999 | |

* cited by examiner

Primary Examiner—Alison K. Pickard
Assistant Examiner—Vishal Patel
(74) Attorney, Agent, or Firm—Jacobson Holman PLLC

(57) ABSTRACT

In a cover gasket for a hard disc apparatus in which a cover and a rubber are later bonded by using an adhesive agent, in order to prevent running out of the adhesive agent and peeling off of the rubber as much as possible, a recess portion for storing the adhesive agent is provided on a bonding surface of the cover or the rubber, and the bonding is executed in a state of storing the adhesive agent in this recess portion, the recess being provided in the center in the width direction of the bonding surface of the rubber, or being provided in end portions in the width direction of the bonding surface of the rubber.

1 Claim, 16 Drawing Sheets

COVER GASKET FOR HARD DISK DEVICE

This is a continuation of PCT/JP01/07368, filed 28 Aug. 2001 and published in Japan.

TECHNICAL FIELD

The present invention relates to a cover gasket used in a hard disc apparatus.

BACKGROUND OF THE INVENTION

Conventionally, there has been known a cover gasket 1 for a hard disc apparatus structured, as shown in FIG. 16, such that a rubber 3 corresponding to a sealing gasket is combined with a top cover 2 of the hard disc, and as means for combining the cover 2 and the rubber 3, there can be listed up a structure in which the rubber 3 is integrally molded with the cover 2, a structure in which the rubber 3 having a stainless core metal inserted therein is used and is laid on the cover 2, a structure in which a foamed urethane or a liquid rubber is applied to the cover 2 and cured, a structure in which the cover 2 and the rubber 3 are bonded by using an adhesive agent at a later stage, or the like.

Among them, in the case that the cover 2 and the rubber 3 are bonded later by using the adhesive agent, there is a problem of an inferior bonding due to running out of the adhesive agent.

A mechanism by which running out of adhesive agent and peeling off of the rubber 3 are generated is as follows.

That is, in the case that the cover 2 and the rubber 3 are later bonded by using the adhesive agent (not shown) as shown in FIG. 17, the adhesive agent is applied onto a bonding surface 3a of the rubber 3 and the cover 2 and the rubber 3 are set to a bonding jig 11, thereafter heating and bonding are executed while applying a load P from above (the side of an upper jig 12) as shown in FIG. 18. At this time, in the case that a magnitude of the load P is too great, the rubber 3 is strongly pressed against a lower jig 13 and an excessive force P1 is generated in the outward direction. Accordingly, the adhesive agent 4 applied to the bonding surface 3a of the rubber 3 is forced out, whereby the running out of adhesive agent is caused. Further, since a bonding film interposed between the cover 2 and the rubber 3 becomes accordingly thin, a reduction of bonding force is generated. Further, since the rubber 3 is elastically returned at a time of taking out the top cover 2 from the jig 11, a shear stress P2 is generated in the reverse direction to that at the bonding time as shown in FIG. 19, whereby peeling off of the rubber 3 is caused.

The magnitude of load P, that is, the pressing force of the bonding portion is controlled so that running out of the adhesive agent 4 as mentioned above is not generated and the bonding film does not become thin, and a carrier 14 (refer to FIG. 16) is provided in the jig 11 so as not to press the rubber 3 too much.

However, when a flatness of the bonding portion in the cover 2 is inferior, a great pressing force is required for bonding all the surface of the bonding portion, and even when the carrier 14 is provided in the jig 11, running out of the adhesive agent 4 becomes much due to a partial warp of the cover 2, or the film thickness of the adhesive agent 4 becomes thin. The cover 2 is formed by a press molding, and particularly, in the case of press forming the cover 2 by using a stainless sheet or the like, since a spring back is generated after pressing, it is hard to make the flatness good enough to obtain a good bonding.

Further, when applying the adhesive agent 4 to the bonding surfaces, thereafter sticking the bonding surfaces and putting them on a hot plate in a pressing state, the adhesive agent 4 kept between the bonding surfaces due to a balance of the pressing force and a surface tension of the adhesive agent 4 looses the surface tension in accordance with an increase of temperature, the balance is lost at a certain temperature, and the adhesive agent 4 is pressed out from the bonding surface. At this time, since the adhesive agent 4 is pressed out from a portion having a weak balance first, and a viscosity of the adhesive agent 4 is reduced due to the temperature increase, the adhesive agent is pressed out in such a manner as to run out irregularly from a plurality of portions instead of being pressed out uniformly from a whole of the outer periphery of the bonding surface. Accordingly, as a result, a state after running out becomes to be in a shape in which the adhesive agent 4 runs out zigzagedly from both sides of the rubber 3 like as legs of a scolopendra as shown in a model view in FIG. 20.

Further, a cover gasket in which the cover and the rubber are later bonded by using the adhesive agent is described in Japanese Patent publication No. 2517797, however, the prior art described in this publication is structured such as to run out the adhesive agent and to coat and fix rubber burrs by running out of adhesive agent, that is, running out of the adhesive agent is positively accepted.

The present invention is made by taking the above points into consideration, and an object of the present invention is to provide a cover gasket for a hard disc apparatus in which a cover and a rubber are later bonded by using an adhesive agent, wherein it is possible to prevent running out of an adhesive agent and peeling off of rubber as much as possible.

DISCLOSURE OF THE INVENTION

In order to achieve the object mentioned above, in accordance with a first aspect of the present invention, there is provided a cover gasket for a hard disc apparatus in which a cover and a rubber are later bonded by using an adhesive agent, characterized in that a recess portion for storing the adhesive agent is provided on a bonding surface of the cover or the rubber.

Further, in accordance with a second aspect of the present invention, there is provided a cover gasket as recited in the first aspect mentioned above, characterized in that the recess portion is provided in the center in the width direction of the bonding surface of the rubber.

Further, in accordance with a third aspect of the present invention, there is provided a cover gasket as recited in the first aspect mentioned above, characterized in that the recess portion is provided in the end portions in the width direction of the bonding surface of the rubber.

When the recess portion for storing the adhesive agent is provided on the bonding surface of the cover or the rubber as in the cover gasket in accordance with the first aspect of the present invention provided with the structure mentioned above, the adhesive agent is stored in the recess portion even in the case a pressing force at a time of bonding is large, so that it is possible to restrict running out of the adhesive agent to the minimum. Further, since a bonding film thickness becomes thicker by a part of adhesive agent being stored in the recess portion, it is possible to reinforce a bonding force. In the case of the recess portion is provided on the bonding surface of the rubber, it may be provided in the center in the width direction of the bonding surface as described in the second aspect, or it may be provided in the end portion in the width direction as described in the third aspect. In the latter case, the recess portions also open to side surfaces of the rubber.

In this case, the later bonding means bonding the cover and the rubber after forming each of them in a product shape independently.

BEST MODE FOR CARRYING OUT THE INVENTION

Next, a description will be given of embodiments in accordance with the present invention with reference to the accompanying drawings.

First Embodiment

Figure 1:
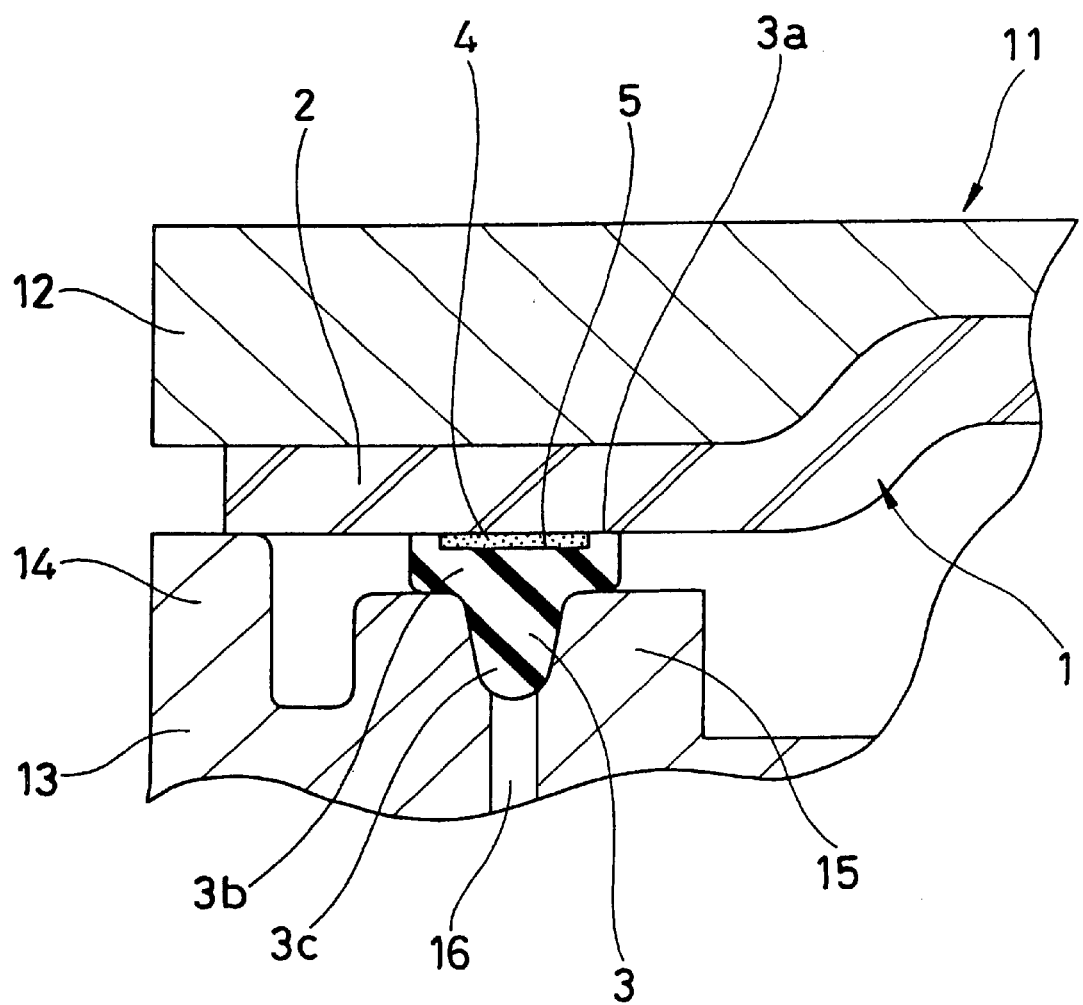
FIG. 1 is a cross sectional view of a main portion showing a bonding step of a cover gasket in accordance with a first embodiment of the present invention.
Figure 2:
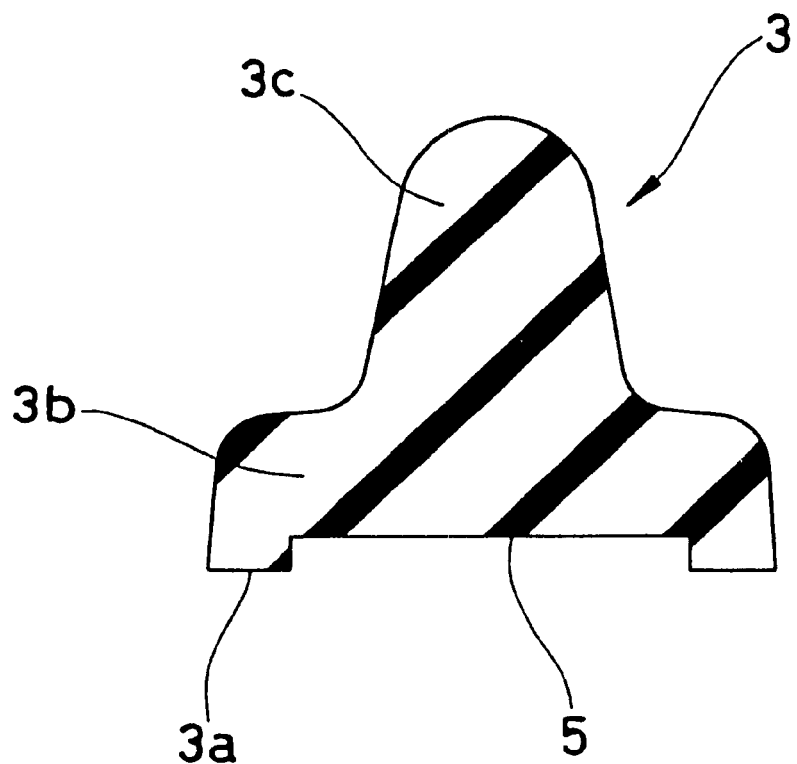
FIG. 2 is a cross sectional view of a rubber corresponding to a constituting part of the cover gasket.

FIG. 1 shows a state in which a cover gasket 1 in accordance with a first embodiment of the present invention is set to a bonding jig 11 for later bonding a cover 2 and a rubber (also called as a gasket in the narrow sense) 3 corresponding to constituting parts of the cover gasket 1 by using an adhesive agent 4. As shown in FIG. 2 in an enlarged manner, a recess portion 5 for storing an adhesive agent is previously provided in the center in the width direction of a bonding surface 3a of the rubber 3 so as to be formed in a groove shape, and the structure is made such that the cover 2 and the rubber 3 are bonded in a state in which a part of the adhesive agent 4 applied to the bonding surface 3a of the rubber 3 is stored in the recess portion 5, as shown in FIG. 1.

The cover 2 is formed by press forming a raw material made of a stainless steel, an aluminum alloy or a laminated member (obtained by holding a resin material having a thickness 20 to 50 μm between the stainless steel, the aluminum alloy or the like) or the like.

The rubber 3 is structured such that one surface of a comparatively wide flange portion 3b is formed as the bonding surface 3a with respect to the cover 2, and a comparatively narrow lip portion 3c is integrally formed in the center in the width direction in the opposite side thereto, and the rubber 3 is formed of a fluorine-contained rubber (FKM), an ethylene propylene diene rubber (EPDM), an acrylonitrile butadiene rubber (NBR), an acrylic rubber or the like, in which a hardness is set to about Hs 20 to 80. Further, the width in the cross sectional shape is actually about 1.5 to 2 mm, and the height in the same is actually formed to be about 1.5 mm.

The groove-like recess portion 5 is provided all through the length of the rubber 3 along a layout of flat surface of the rubber 3, and the depth in the cross sectional shape is actually formed to be about 0.2 mm or less. Further, the width of the recess portion 5 shown in FIG. 1 is formed so as to be lager than the width of the lip portion 3c, however, may be set to be nearly equal to or less than the width of the lip portion 3c under a certain conditions of a rubber hardness, a compression allowance, a surface pressure or the like of the lip portion 3c.

An epoxy resin based adhesive agent is frequently employed for the adhesive agent 4, and the adhesive agent 4 is applied to the rubber 3 in accordance with a transcription by a stamp, a printing or the like.

Further, an bonding jig 11 as illustrated is constructed of a combination of an upper jig 12 and a lower jig 13, and a carrier 14 for limiting a compression amount of the rubber 3 by holding the cover 2 between the carrier and the upper jig 12 at a time of bonding, a supporting portion 15 for supporting the rubber 3 at a time of bonding, a negative pressure suction port 16 and the like are provided an upper surface of the lower jig 13.

Figure 3:
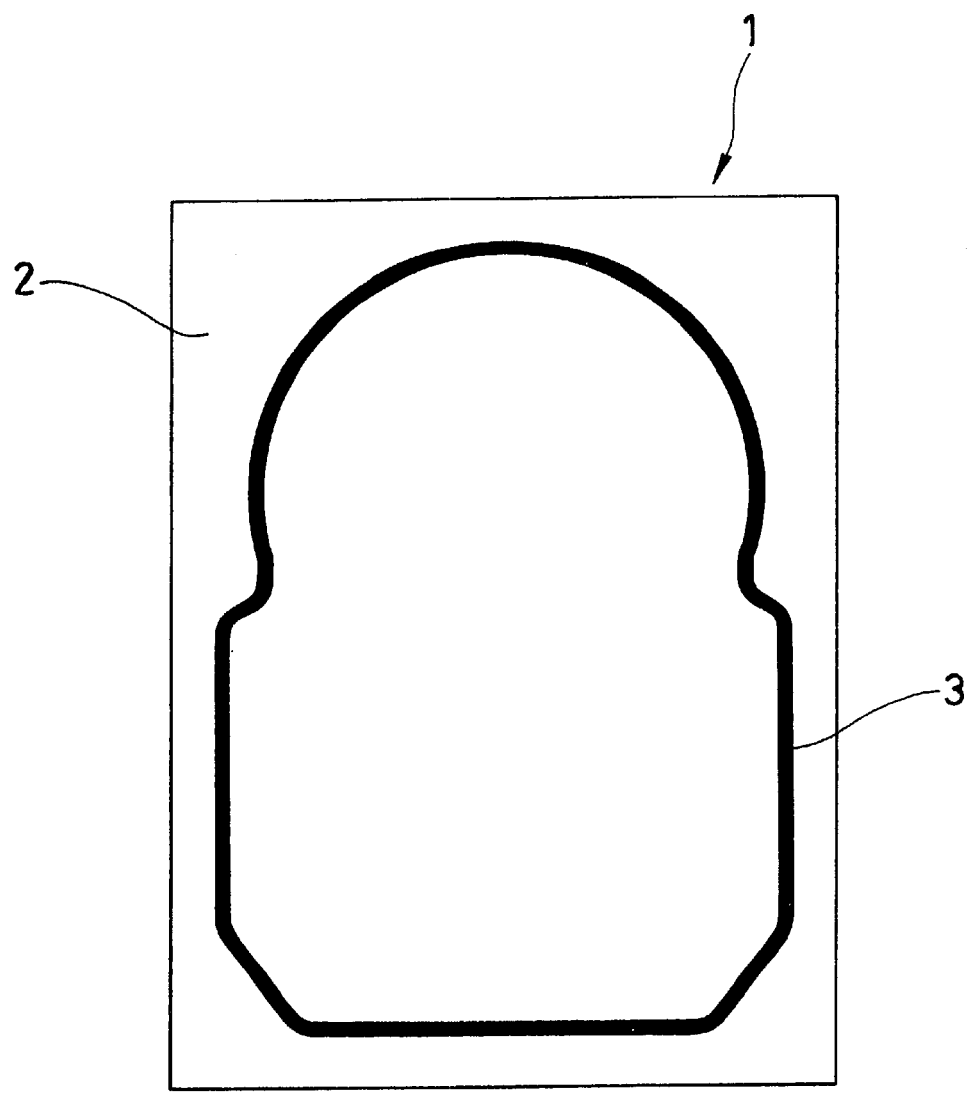
FIG. 3 is a view of a comparative model showing a completed state of the cover gasket.

In the cover gasket 1 having the structure mentioned above, since the recess portion 5 for storing the adhesive agent is provided in the center in the width direction of the bonding surface 3a of the rubber 3 so as to be formed in the groove shape as mentioned above, a part of the adhesive agent 4 is stored in the groove-like recess portion 5 at a time of applying the adhesive agent 4 to the bonding surface 3a of the rubber 3, and the bonding is executed in this state. Accordingly, even when the pressing force at a time of bonding is great, the adhesive agent 4 is stored in the groove-like recess portion 5, so that as shown in a model view in FIG. 3, it is possible to restrict running out of the adhesive agent 4 to the minimum.

Second Embodiment

Figure 4:
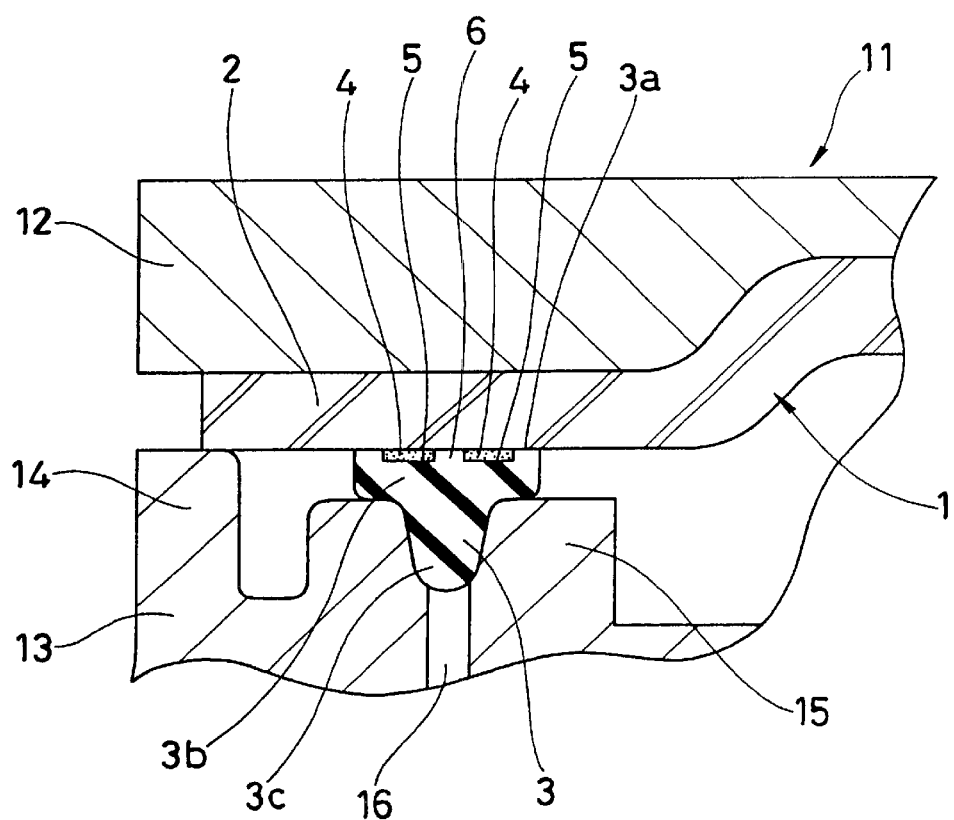
FIG. 4 is a cross sectional view of a main portion showing a bonding step of a cover gasket in accordance with a second embodiment of the present invention.
Figure 5:
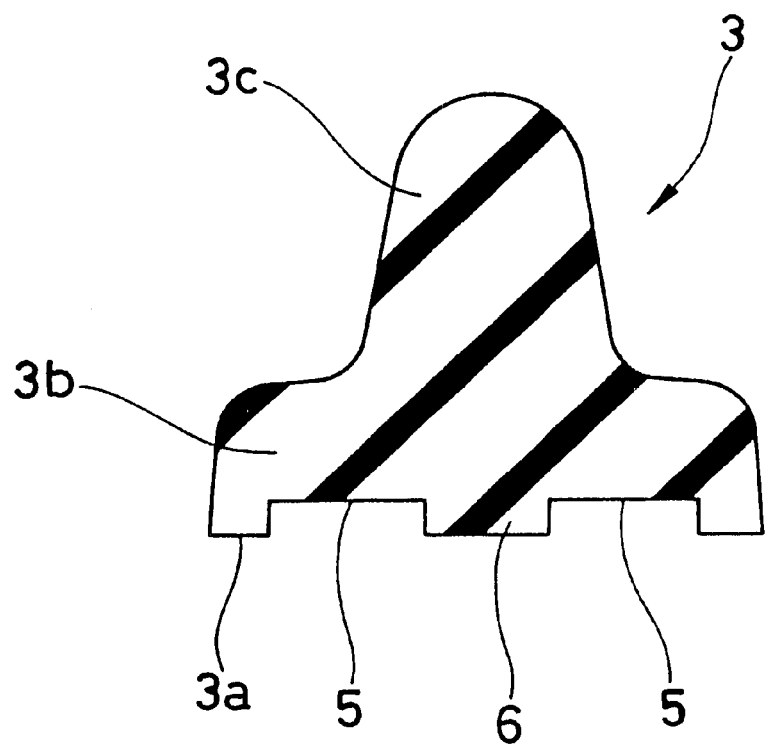
FIG. 5 is a cross sectional view of a rubber corresponding to a constituting part of the cover gasket.

In the first embodiment mentioned above, only one groove-like recess portion 5 is provided on the bonding surface 3a of the rubber 3. In this case, however, as shown in FIGS. 4 and 5, a plurality of (two in the drawing) groove-like recess portions may be provided.

Third Embodiment

Figure 6:
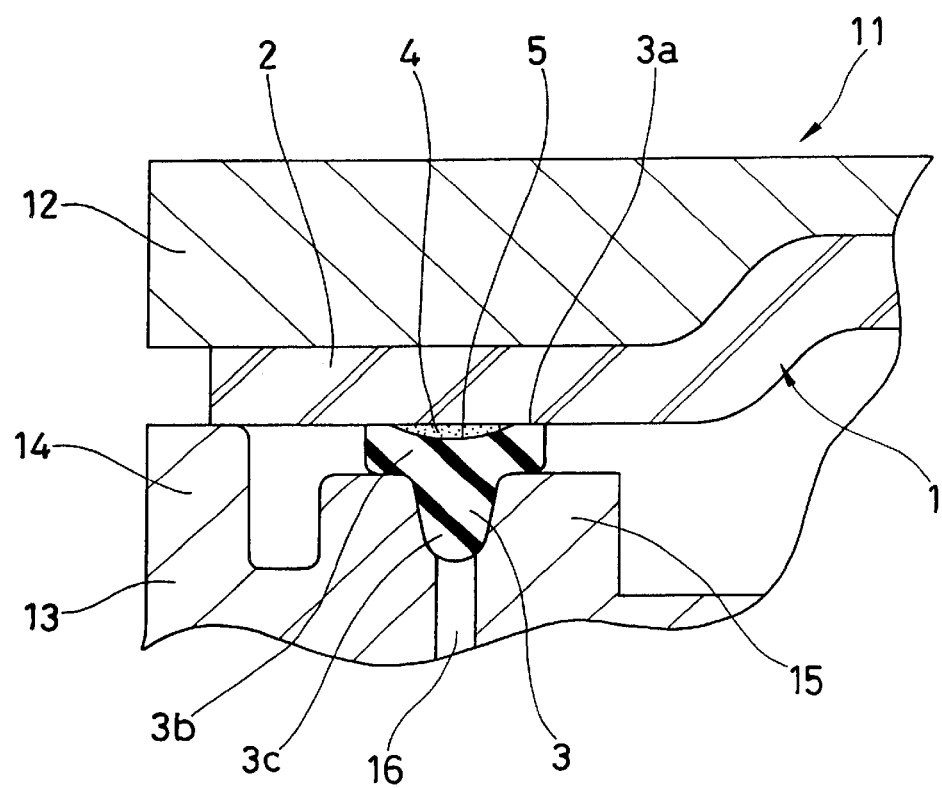
FIG. 6 is a cross sectional view of a main portion showing a bonding step of a cover gasket in accordance with a third embodiment of the present invention.
Figure 7:
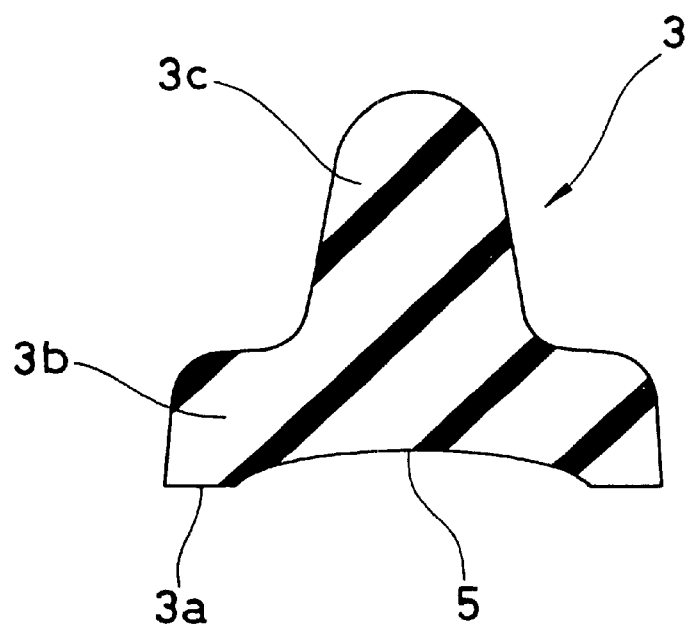
FIG. 7 is a cross sectional view of a rubber corresponding to a constituting part of the cover gasket.

Further, in the first embodiment mentioned above, the cross sectional shape of the groove-like recess portion 5 is formed in a long sideways rectangular (oblong) shape, however, as shown in FIGS. 6 and 7, it may be formed in a non-rectangular shape (a circular arc shape in cross section in the drawing). In this case, it is possible to adjust an application direction or a generation direction of a pressing force or a shear stress at a time of bonding.

Fourth Embodiment

Further, the recess portion 5 is not limited to the groove-shaped structure, and a lot of recess portions 5 may be provided so as to be arranged along the longitudinal direction of the rubber 3, or it is possible to utilize a surface roughness formed on the bonding surface 3a.

Fifth Embodiment

Further, the recess portion 5 may be formed on the bonding surface of the cover 2, or may be formed on the bonding surfaces of both of the cover 2 and the rubber 3.

In addition, in the case that a plurality of groove-like recess portions 5 are provided on the bonding surface 3a of the rubber 3 as in the second embodiment (FIGS. 4 and 5), the following function and effects can be obtained.

That is, in the case that only one groove-like recess portion 5 is provided on the bonding surface 3a of the rubber 3, the cross sectional shape of the recess portion 5 deforms so as to make the depth of the center portion in the width direction smaller due to the pressing, at a time of setting the depth of the recess portion 5 to be large, and there is a possibility that a part of the adhesive agent 4 within the recess portion 5 runs out from the end potion in the width direction of the recess portion 5, however, in the case that a plurality of groove-like recess portions 5 are provided on the bonding surface 3a of the rubber 3 as in the second embodiment, since a column portion (portion without recess portion being formed) 6 between a plurality of recess portions 5 serves as a support, it is possible to prevent the depth of the center portion in the width direction of the recess portion 5 from becoming small, whereby it is possible to prevent the adhesive agent 4 from running out even when setting the depth of the recess portion 5 to be large. Further, on the other hand, in accordance with the structure of the second embodiment, since it is possible to make the depth of the recess portion 5 large so as to make a receiving amount of the adhesive agent 4 much, a capacity of absorbing a dispersion of application amount of the adhesive agent is increased, so that it is possible to prevent the adhesive agent from running out even when the adhesive agent is applied on the somewhat excessive side.

Sixth Embodiment

Figure 8:
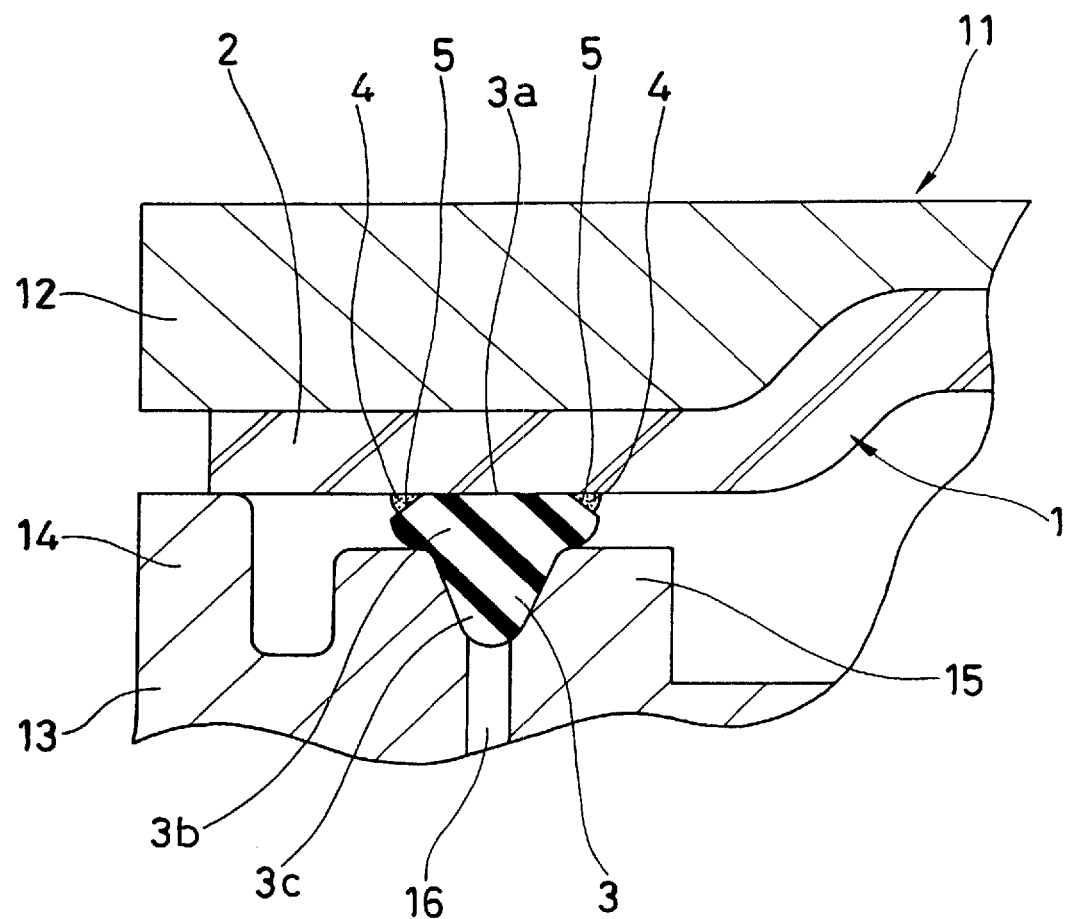
FIG. 8 is a cross sectional view of a main portion showing a bonding step of a cover gasket in accordance with a sixth embodiment of the present invention.
Figure 9:
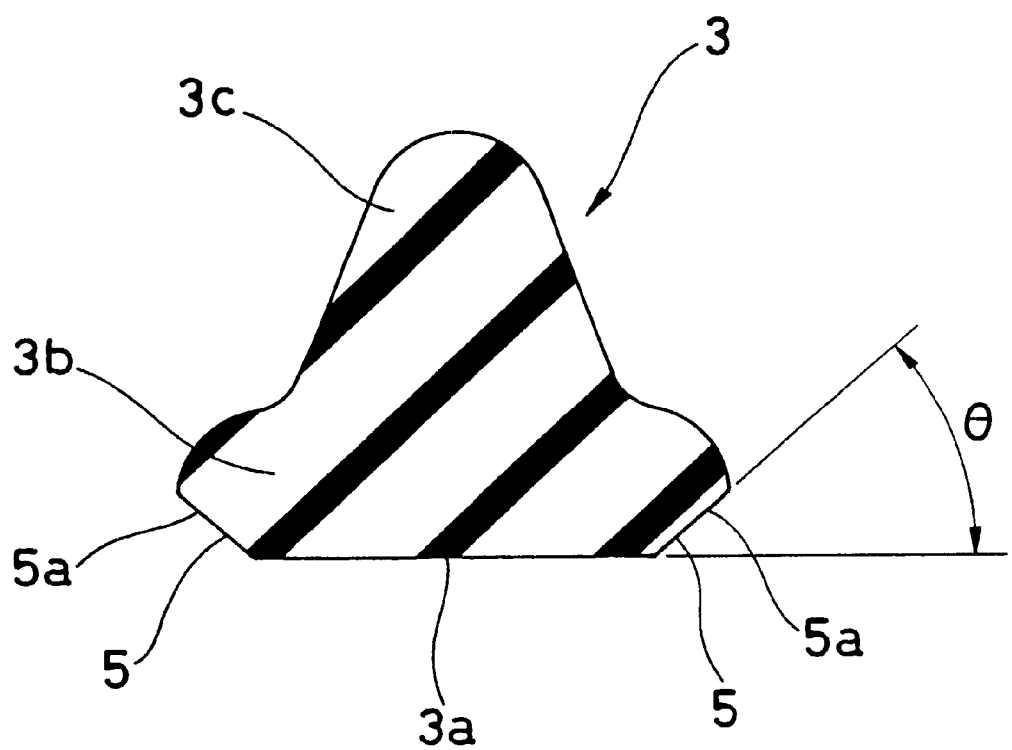
FIG. 9 is a cross sectional view of a rubber corresponding to a constituting part of the cover gasket.

FIG. 8 shows a state in which a cover gasket 1 in accordance with a sixth embodiment of the present invention is set to a bonding jig 11 for later bonding a cover 2 and a rubber (also called as a gasket in the narrow meaning sense) 3 corresponding to constituting parts of the cover gasket 1 by using an adhesive agent 4. As shown in FIG. 9 in an enlarged manner, recess portions 5 for storing an adhesive agent are previously symmetrically provided respectively in both the end portions in the width direction of a bonding surface 3a of the rubber 3 so as to be formed in a beveled shape, and the structure is made such that the cover 2 and the rubber 3 are bonded in a state in which a part of the adhesive agent 4 applied to the bonding surface 3a of the rubber 3 is stored in the recess portions 5, as shown in FIG. 8.

The cover 2 is formed by press forming a raw material made of a material obtained by applying an electroless nickel plating to a stainless steel, an aluminum alloy or a brass or the like, or a laminated member based on them or the like.

The rubber 3 is structured such that one surface of a comparatively wide flange portion 3b is formed as the bonding surface 3a with respect to the cover 2, and a comparatively narrow lip portion 3c is integrally formed in the center in the width direction in the opposite side thereto, and the rubber 3 is formed of a fluorine-contained rubber (FKM), an ethylene propylene diene rubber (EPDM), an acrylonitrile butadiene rubber (NBR), an urethane rubber or the like, in which a hardness is set to about Hs 20 to 80. Further, the width in the cross sectional shape is actually about 1.5 to 2 mm, and the height in the same is actually formed to be about 1.5 mm.

The bevel-like recess portions 5 are provided all through the length of the rubber 3 along a layout of flat surface of the rubber 3, and the height in the cross sectional shape is actually formed to be about 0.2 mm or less. Further, the bevel-like recess portions 5 are formed in a shape obtained by obliquely cutting the end portions in the width direction of the bonding surface 3a, and have inclined surfaces 5a having a linear cross sectional shape, and it is preferable to set an angle of incline of the inclined surfaces 5a with respect to the bonding surface 3a between 20 and 70 degrees, and it is further preferable to set it to 40 degrees. The angle of incline θ is set to the value mentioned above because it is possible to restrict discharge resistance and to sufficiently secure the capacity for storing the adhesive agent 4. The cross sectional shape corresponds to a shape in which the inclined surfaces 5a cross the bonding surface 3a out of square, and outlets in the running out direction of the adhesive agent 4 are gradually expanded.

A one-component thermosetting type epoxy based adhesive agent is frequently employed for the adhesive agent 4, and the adhesive agent 4 is applied to the rubber 3 in accordance with a transcription by a stamp, a printing or the like.

Further, a bonding jig 11 as illustrated is constructed of a combination of an upper jig 12 and a lower jig 13, and a carrier 14 for limiting a compression amount of the rubber 3 by holding the cover 2 between the carrier and the upper jig 12 at a time of bonding, a supporting portion 15 for supporting the rubber 3 at a time of bonding, a negative pressure suction port 16 and the like are provided on the upper surface of the lower jig 13.

In the cover gasket 1 having the structure mentioned above, since the recess portions 5 for storing the adhesive agent are symmetrically provided in the both end portions in the width direction of the bonding surface 3a of the rubber 3 so as to be formed in the bevel shape as mentioned above, a part of the adhesive agent 4 is stored in the bevel-like recess portions 5 at a time of applying the adhesive agent 4 to the bonding surface 3a of the rubber 3, and the bonding is executed in this state. Accordingly, even when the pressing force at a time of bonding is great, the adhesive agent 4 is stored in the bevel-like recess portions 5, so that as shown in a model view in FIG. 3, it is possible to restrict running out of the adhesive agent 4 to the minimum. Further, since the adhesive agent 4 is stored in the bevel-like recess portions 5, an application area of the adhesive agent 4 is increased, whereby it is possible to reinforce the bonding force, thereby making it possible to prevent the peeling off from being generated in the rubber 3.

In this case, in the sixth embodiment mentioned above, the recess portions 5 are provided in the end portions in the width direction of the bonding surface 3a in the rubber 3 so as to be formed in the bevel shape, however, the recess portions may be formed in a notch shape as exemplified below.

Seventh Embodiment

Figure 10:
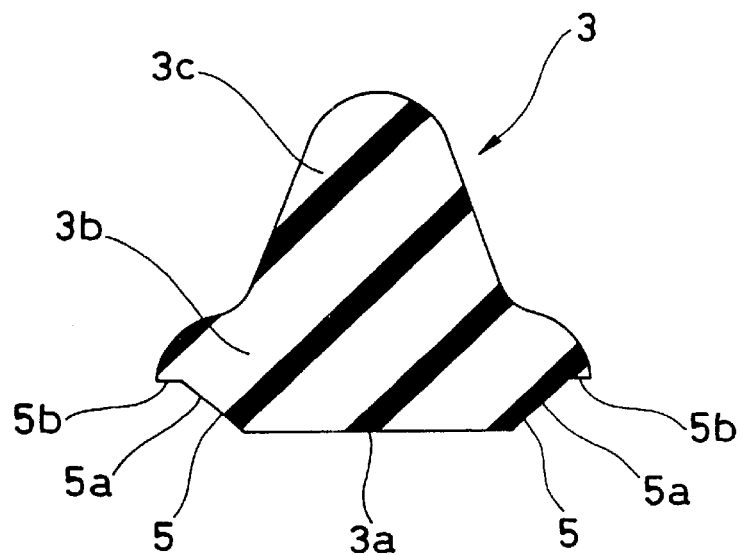
FIG. 10 is a cross sectional view of a rubber corresponding to a constituting part of a cover gasket in accordance with a seventh embodiment of the present invention.

As shown in FIG. 10, the inner surfaces of the recess portions 5 are formed by a combination of inclined surfaces 5a having a linear cross sectional shape and being provided with a predetermined angle of incline with respect to the bonding surface 3a, and horizontal surfaces 5b having a linear cross sectional shape and being parallel to the bonding surface 3a. This cross sectional shape corresponds to a shape in which the inclined surfaces 5a cross the bonding surface 3a out of square and outlets in the running out direction of the adhesive agent 4 are gradually expanded within the recess portions 5, in the same manner as that of the sixth embodiment mentioned above.

Eighth Embodiment

Figure 11:
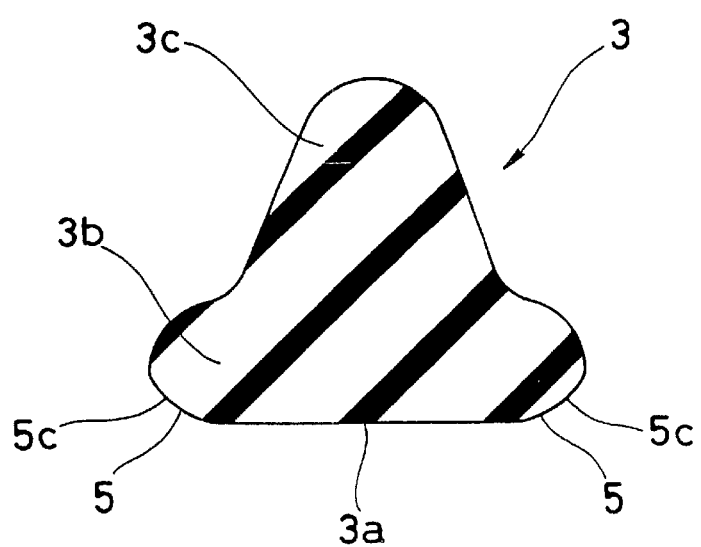
FIG. 11 is a cross sectional view of a rubber corresponding to a constituting part of a cover gasket in accordance with an eighth embodiment of the present invention.

As shown in FIG. 11, the inner surfaces of the recess portions 5 are formed by curved surfaces 5c having a convex curved cross sectional shape. This cross sectional shape corresponds to a shape in which the curved surfaces 5c cross the bonding surface 3a out of square and outlets in the running out direction of the adhesive agent 4 are gradually expanded within the recess portions 5.

Ninth Embodiment

Figure 12:
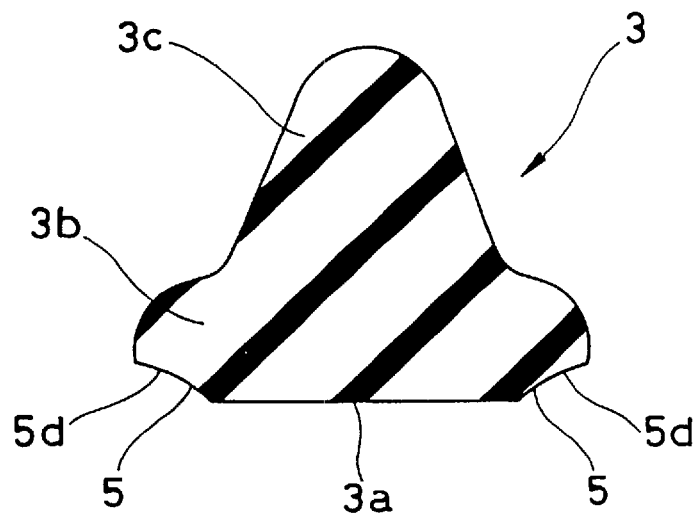
FIG. 12 is a cross sectional view of a rubber corresponding to a constituting part of a cover gasket in accordance with a ninth embodiment of the present invention.

As shown in FIG. 12, the inner surfaces of the recess portions 5 are formed by curved surfaces 5d having a concave curved cross sectional shape. This cross sectional shape corresponds to a shape in which the curved surfaces 5d cross the bonding surface 3a out of square and outlets in the running out direction of the adhesive agent 4 are gradually expanded within the recess portions 5, in the same manner as that of the eighth embodiment mentioned above.

Tenth Embodiment

Figure 13:
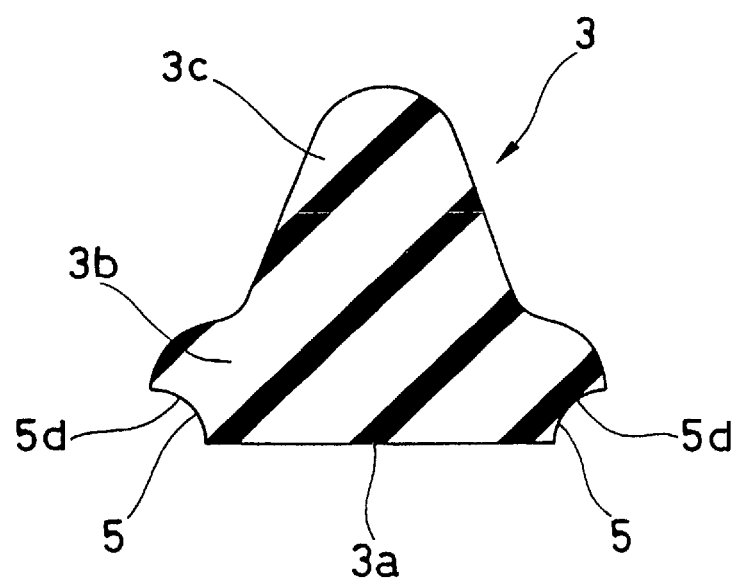
FIG. 13 is a cross sectional view of a rubber corresponding to a constituting part of a cover gasket in accordance with a tenth embodiment of the present invention.

As shown in FIG. 13, the inner surfaces of the recess portions 5 are formed by curved surfaces 5d having a concave curved cross sectional shape. In this cross sectional shape, the curved surfaces 5d cross the bonding surface 3a on the square.

Eleventh Embodiment

Figure 14:
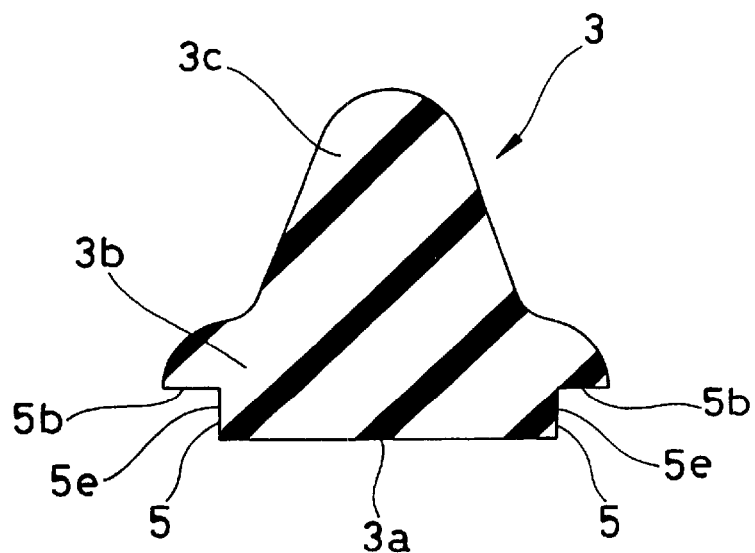
FIG. 14 is a cross sectional view of a rubber corresponding to a constituting part of a cover gasket in accordance with an eleventh embodiment of the present invention.

As shown in FIG. 14, the inner surfaces of the recess portions 5 are formed by a combination of vertical surfaces 5e having a linear cross sectional shape and being perpendicular to the bonding surface 3a, and horizontal surfaces 5b having the linear cross sectional shape and being parallel to the bonding surface 3a. In this cross sectional shape, the vertical surfaces 5e cross the bonding surface 3a on the square.

Twelfth Embodiment

Figure 15:
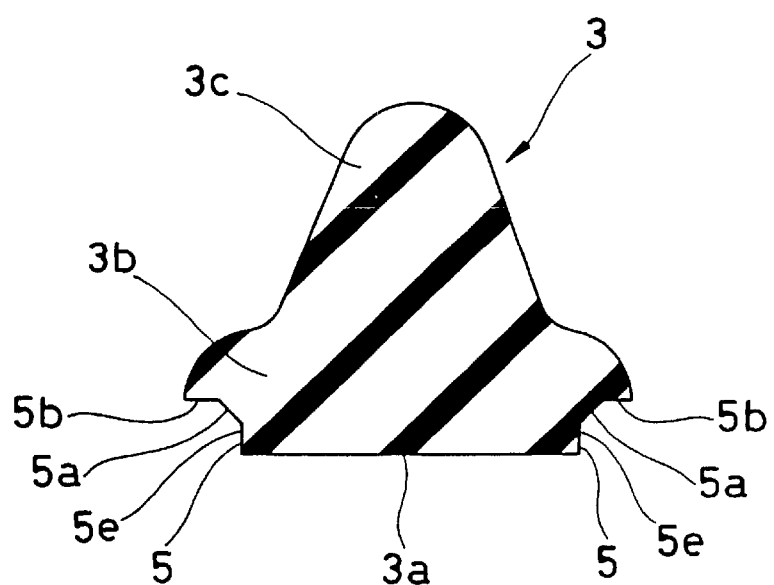
FIG. 15 is a cross sectional view of a rubber corresponding to a constituting part of a cover gasket in accordance with a twelfth embodiment of the present invention.
Figure 16:
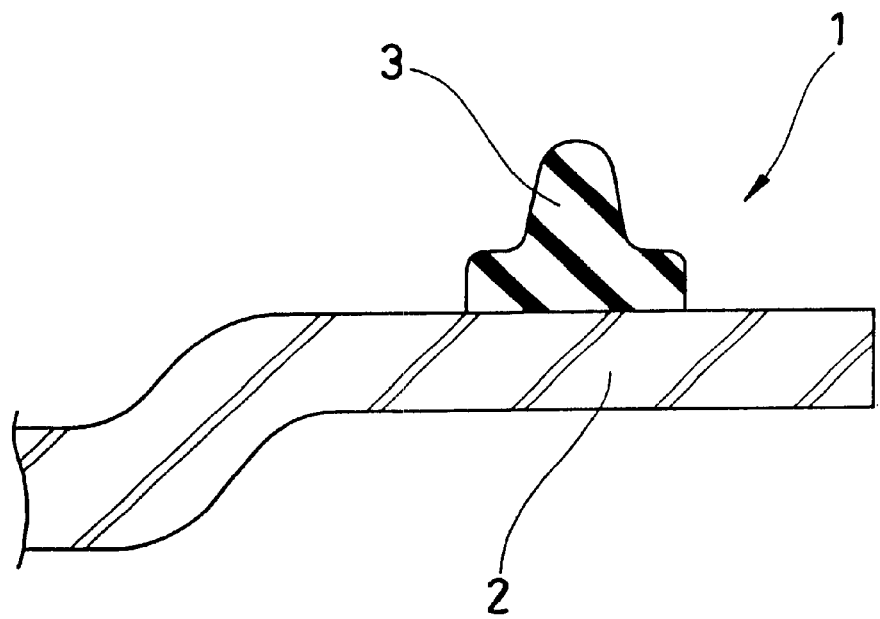
FIG. 16 is a cross sectional view of a main portion of a cover gasket in accordance with a conventional embodiment.
Figure 17:
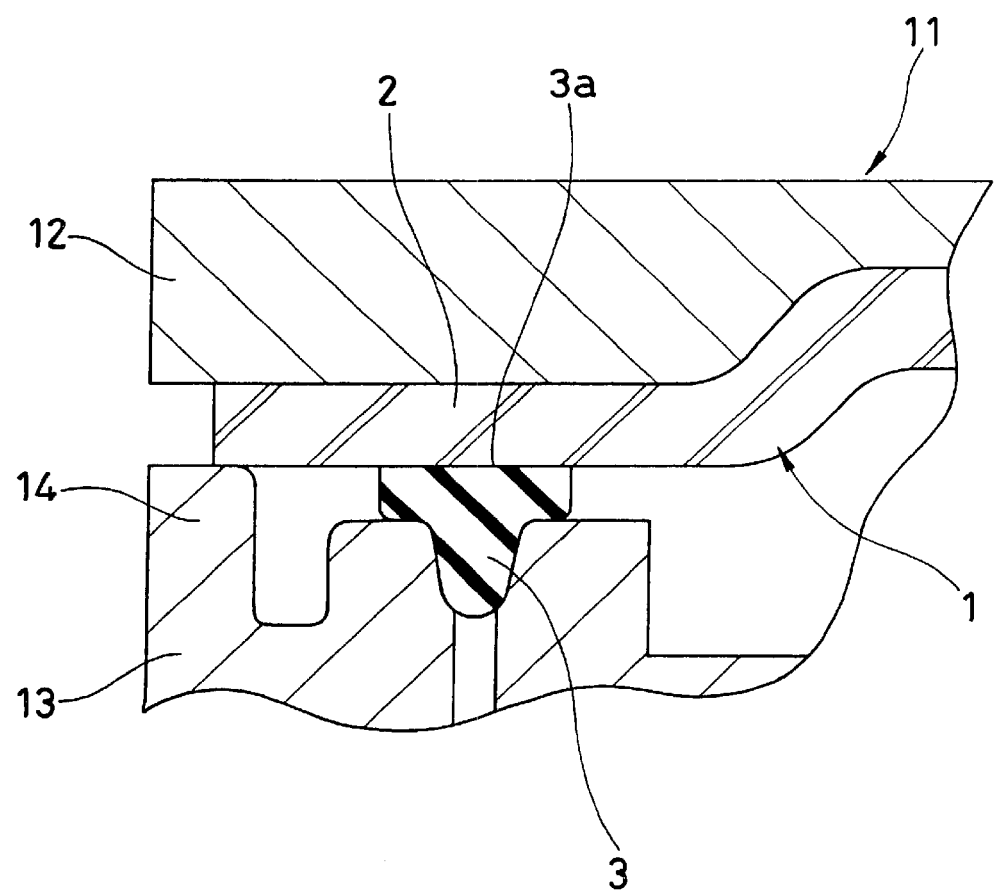
FIG. 17 is a cross sectional view of a main portion showing a bonding step of the cover gasket.
Figure 18:
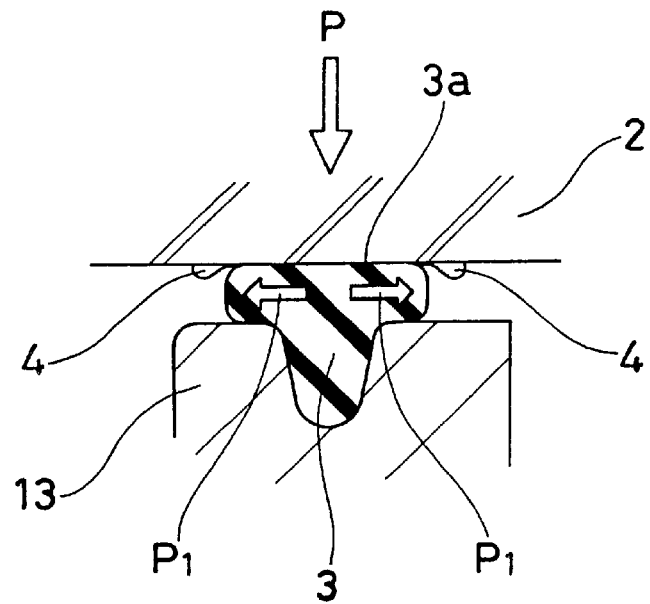
FIG. 18 is a schematic view showing an applying direction of a pressing force in the bonding step of the cover gasket.
Figure 19:
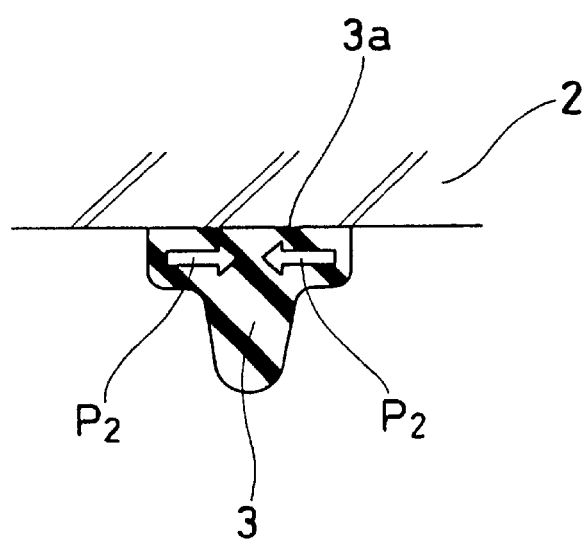
FIG. 19 is a schematic view showing a generating direction of a shear stress in the bonding step of the cover gasket.
Figure 20:
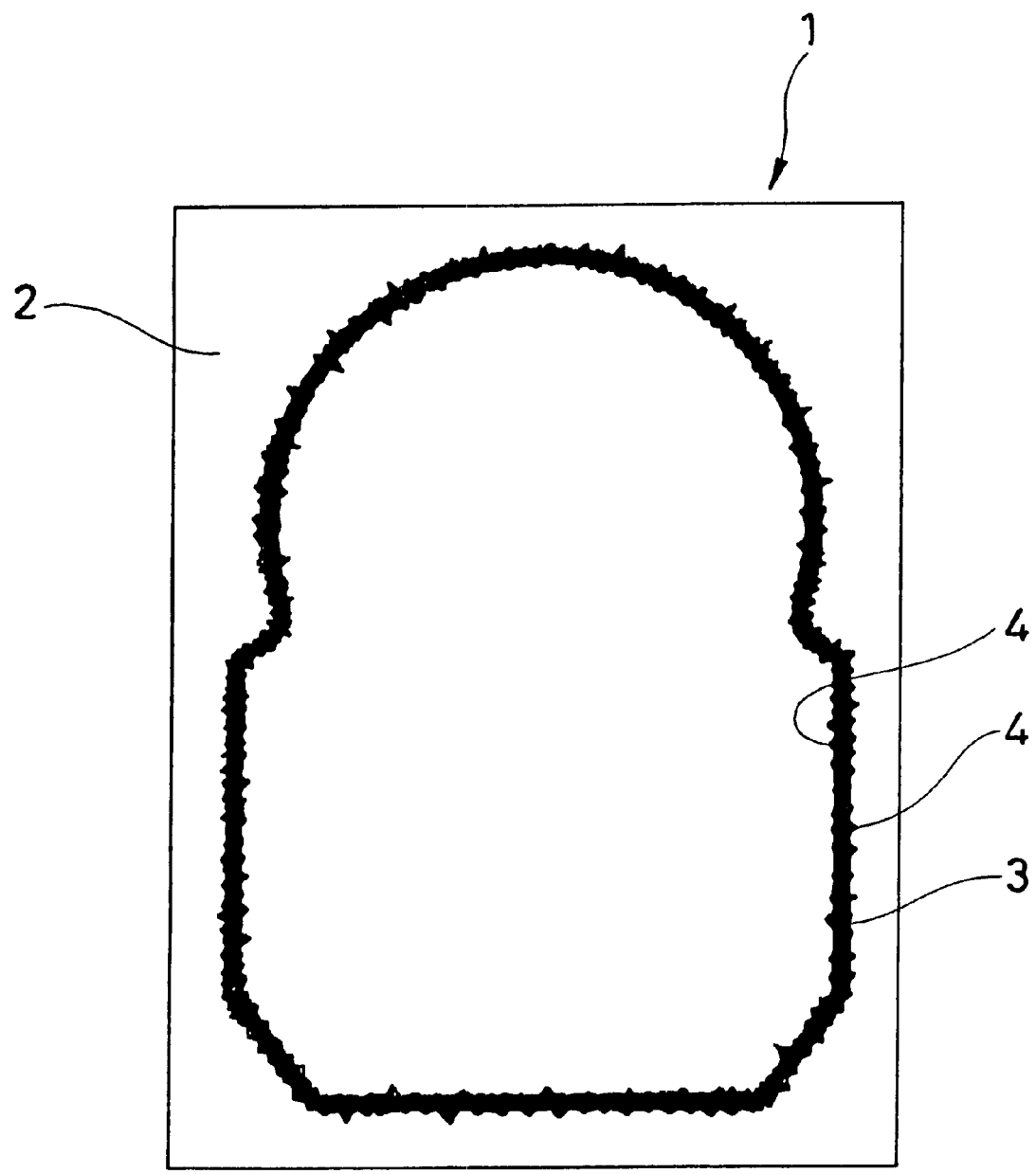
FIG. 20 is a view of a comparative model showing a completed state of the cover gasket.

As shown in FIG. 15, the inner surfaces of the recess portions 5 are formed by a combination of vertical surfaces 5e having a linear cross sectional shape and being perpendicular to the bonding surface 3a, inclined surfaces 5a having the linear cross sectional shape and being provided with the predetermined angle of incline with respect to the bonding surface 3a, and horizontal surfaces 5b having the linear cross sectional shape and being parallel to the bonding surface 3a. In this cross sectional shape, the vertical surfaces 5e cross the bonding surface 3a on the square.

All of the recess portions 5 constituted by the cross sectional shapes achieve the function of storing the adhesive agent 4 in the inner portions thereof, in particular, in the case of the shape in which the inclined surfaces 5a or the curved surfaces 5d cross the bonding surface 3a out of square and the outlets in the running out direction of the adhesive agent 4 are gradually expanded within the recess portions 5, as in the sixth, seventh, eighth or ninth embodiment mentioned above, discharge resistance of the adhesive agent 4 in the outlets is small, whereby the adhesive agent 4 applied to the bonding surface 3a of the rubber 3 slowly flows out to the recess portions 5 from the portion between the rubber 3 and the cover 2 before the temperature increases, so that it is possible to particularly effectively restrict the running out phenomenon of the adhesive agent 4. Further, in the case that the adhesive agent 4 is a fluid having a high viscosity and flows out along angled walls of the rubber 3, it is also possible to particularly effectively restrict the running out phenomenon of the adhesive agent 4. It is considered that this function and effect can be expected in the case that a cross angle ($\theta$ mentioned above) is within a range from 20 to 70 degrees.

EFFECT OF THE INVENTION AND INDUSTRIAL APPLICABILITY

The present invention achieves the following effects.

That is, in the cover gasket provided with the structures mentioned above in accordance with each of the aspects of the present invention, since the recess portion for storing the adhesive agent is provided on the bonding surface of the cover or the rubber in the gasket formed by later bonding the cover and the rubber with using the adhesive agent, a part of the adhesive agent is stored within the recess portion at a time of applying the adhesive agent to the bonding surface, and the bonding operation is executed in this state. Accordingly, since the adhesive agent is stored in the recess portion even when the pressing force at the bonding time is large, it is possible to restrict running out of the adhesive agent to the minimum. Further, since the bonding film thickness is increased by a part of the adhesive agent being stored in the recess portion, it is possible to reinforce the bonding force, whereby it is possible to restrict peeling off in the rubber.

What is claimed is:

1. A cover gasket for a hard disc apparatus, said cover gasket comprising a cover and a rubber portion to be bonded by an adhesive agent, a recess portion for storing the adhesive agent being provided on a bonding surface of one of the cover and the rubber portion.

* * * * *